US012619825B2

(12) United States Patent
Fox

(10) Patent No.: US 12,619,825 B2
(45) Date of Patent: May 5, 2026

(54) LIST-BASED ENTITY NAME DETECTION

(71) Applicant: HG Insights, Inc., Santa Barbara, CA (US)

(72) Inventor: Robert J. Fox, Santa Barbara, CA (US)

(73) Assignee: HG INSIGHTS, INC., Santa Barbara, CA (US)

( * ) Notice: Subject to any disclaimer, the term of this patent is extended or adjusted under 35 U.S.C. 154(b) by 194 days.

(21) Appl. No.: 18/536,939

(22) Filed: Dec. 12, 2023

(65) Prior Publication Data

US 2024/0152700 A1 May 9, 2024

Related U.S. Application Data

(63) Continuation of application No. 16/550,684, filed on Aug. 26, 2019, now abandoned.

(51) Int. Cl.
| | |
|---|---|
| *G06F 40/295* | (2020.01) |
| *G06F 16/31* | (2019.01) |
| *G06F 40/117* | (2020.01) |
| *G06F 40/205* | (2020.01) |

(52) U.S. Cl.
CPC .......... *G06F 40/295* (2020.01); *G06F 16/328* (2019.01); *G06F 40/117* (2020.01); *G06F 40/205* (2020.01)

(58) Field of Classification Search
None
See application file for complete search history.

(56) References Cited

U.S. PATENT DOCUMENTS

| | | | |
|---|---|---|---|
| 7,558,792 B2 | 7/2009 | Bier | |
| 8,000,956 B2 | 8/2011 | Brun et al. | |

| | | | |
|---|---|---|---|
| 8,731,901 B2 | 5/2014 | Srihari et al. | |
| 8,949,241 B2 | 2/2015 | Olof-Ors | |
| 9,110,882 B2 | 8/2015 | Overell | |
| 9,411,877 B2 * | 8/2016 | Gillam ................. | G06F 16/285 |
| 9,501,503 B2 | 11/2016 | Mitra | |
| 9,552,352 B2 | 1/2017 | Sharifi | |
| 9,594,831 B2 * | 3/2017 | Wang ................. | G06F 16/3346 |
| 9,626,424 B2 | 4/2017 | Houghton | |
| 9,971,763 B2 | 5/2018 | Abdel-Reheem et al. | |
| 10,331,783 B2 | 6/2019 | Liang | |

(Continued)

FOREIGN PATENT DOCUMENTS

WO        2015080558 A1        6/2015

OTHER PUBLICATIONS

Angel L. Garrido, et al., NEREA: Named Entity Recognition and Disambiguation Exploiting Local Document Repositories, 2016 IEEE 28th International Conference on Tools with Artificial Intelligence (ICTAI), Nov. 6-8, 2016, pp. 1035-1042.
Wang, Xinglong, et al., Disambiguating the species of biomedical named entities using natural language parsers, Bioinformatics, vol. 26, issue 5, pp. 661-667, Jan. 6, 2010, Oxford University Press.

(Continued)

*Primary Examiner* — Tamara T Kyle
*Assistant Examiner* — Tyler Schallhorn
(74) *Attorney, Agent, or Firm* — LYON & HARR, LLP; Richard T. Lyon

(57)        ABSTRACT

List-based entity name detection implementations are described that detect entity names in electronic textural documents. In one implementation, unknown entity names are detected. In another implementation, ambiguous entity names are detected and disambiguated. In yet another implementation, generic entity names are detected and associated with an applicable species entity name.

12 Claims, 15 Drawing Sheets

(56) References Cited

U.S. PATENT DOCUMENTS

| | | | |
|---|---|---|---|
| 10,394,854 | B2 | 8/2019 | Mitra |
| 11,366,966 | B1 | 6/2022 | Ramsey |
| 2003/0130835 | A1 | 7/2003 | Azzam |
| 2005/0080656 | A1 | 4/2005 | Crow |
| 2005/0289456 | A1 | 12/2005 | Bier |
| 2007/0067285 | A1 | 3/2007 | Blum |
| 2010/0004925 | A1 | 1/2010 | Ah-Pine |
| 2010/0057713 | A1* | 3/2010 | Gillam ................ G06F 16/2455 |
| | | | 707/E17.014 |
| 2010/0287210 | A1 | 11/2010 | Olof-Ors |
| 2011/0307435 | A1 | 12/2011 | Overell |
| 2012/0036130 | A1 | 2/2012 | Light |
| 2013/0124964 | A1 | 5/2013 | Viegas |
| 2013/0325439 | A1 | 12/2013 | Fink |
| 2013/0346421 | A1* | 12/2013 | Wang .................... G06F 40/295 |
| | | | 707/755 |
| 2014/0040272 | A1 | 2/2014 | Houghton |
| 2014/0337358 | A1 | 11/2014 | Mitra |
| 2015/0286723 | A1 | 10/2015 | Sun |
| 2017/0032023 | A1 | 2/2017 | Mitra |
| 2017/0364503 | A1 | 12/2017 | Anisimovich |

OTHER PUBLICATIONS

Yang, Qing, et al., (2013). Extracting fine-grained entities based on coordinate graph, Natural Language Processing and Information Systems, NLDB 2013, Lecture Notes in Computer Science, pp. 367-371, vol. 7934. Springer, Berlin, Heidelberg.

Bing, Lidong, et al., Improving distant supervision for information extraction using label propagation through lists, 2015, Association for Computational Linguistics. <https://aclanthology.org/D5-1060. pdf> (Year: 2015).

Tu, Hongkui, et al., Entity recognition by distant supervision with soft list constraint, 2017 Springer <https://doi.org/10.1007/978-3-319-69179-4_48> (Year: 2017).

Schallhorn, Tyler J., U.S. Office Action, U.S. Appl. No. 16/550,684, Aug. 18, 2021, pp. 1-23.

Schallhorn, Tyler J., U.S. Final Office Action, U.S. Appl. No. 16/550,684, Jan. 6, 2022, pp. 1-25.

Schallhorn, Tyler J., U.S. Office Action, U.S. Appl. No. 16/550,684, Jun. 21, 2022, pp. 1-20.

Schallhorn, Tyler J., U.S. Office Action, U.S. Appl. No. 16/550,684, Sep. 13, 2023, pp. 1-23.

* cited by examiner

Unknown Entity Name
Detector
100

Unknown Entity
Name Detection
Computer Program
102

FIG. 1

Ambiguous Entity Name
Detector
600

Ambiguous Entity
Name Detection
Computer Program
602

FIG. 6

Generic Entity Name
Detector
900

Generic Entity Name
Detection Computer
Program
902

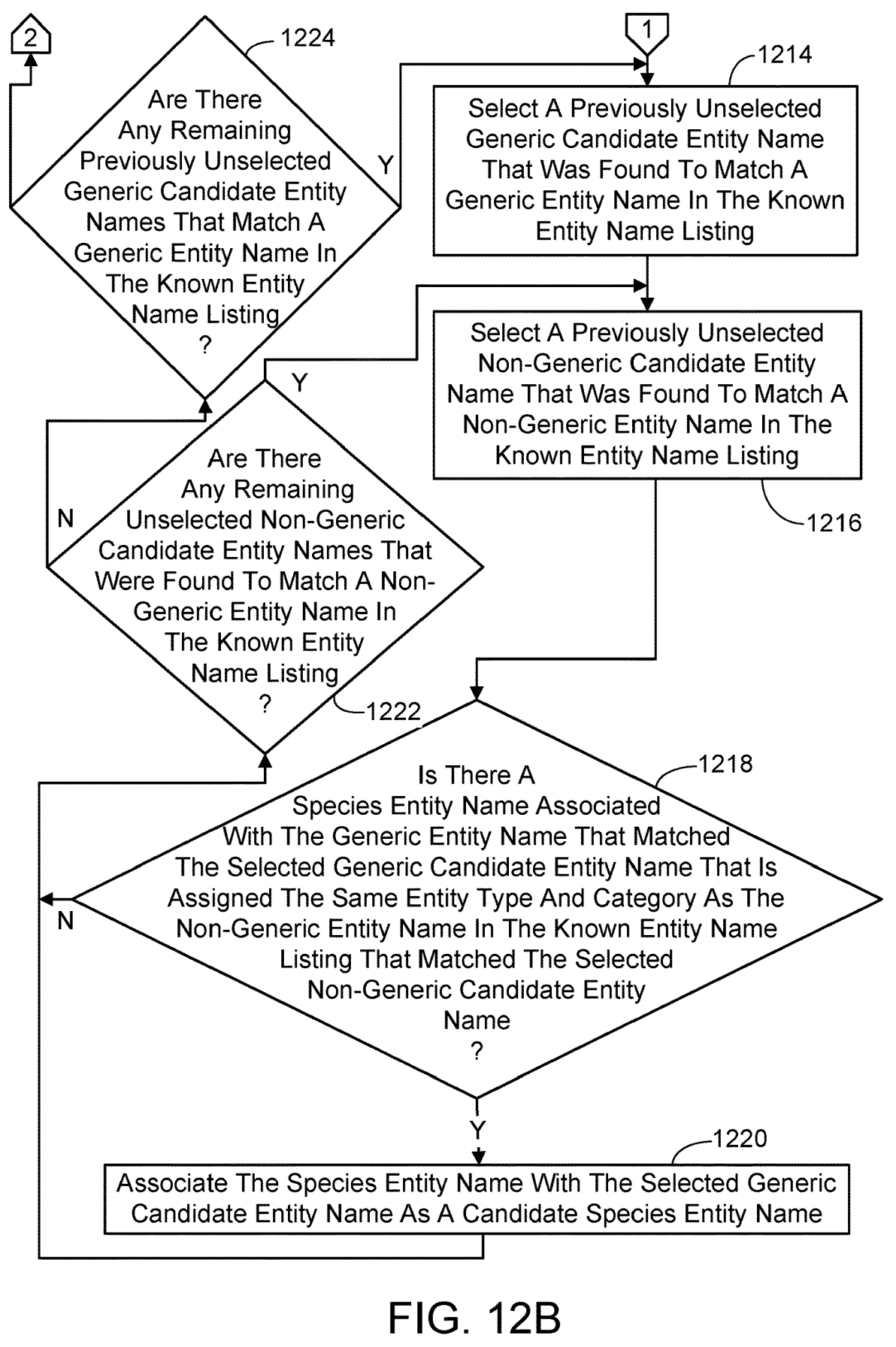

Are There Any Remaining Previously Unselected Generic Candidate Entity Names That Match A Generic Entity Name In The Known Entity Name Listing ?

Y

1

1214

Select A Previously Unselected Generic Candidate Entity Name That Was Found To Match A Generic Entity Name In The Known Entity Name Listing

Y

Are There Any Remaining Unselected Non-Generic Candidate Entity Names That Were Found To Match A Non-Generic Entity Name In The Known Entity Name Listing ?

N

Select A Previously Unselected Non-Generic Candidate Entity Name That Was Found To Match A Non-Generic Entity Name In The Known Entity Name Listing

1216

1222

Is There A Species Entity Name Associated With The Generic Entity Name That Matched The Selected Generic Candidate Entity Name That Is Assigned The Same Entity Type And Category As The Non-Generic Entity Name In The Known Entity Name Listing That Matched The Selected Non-Generic Candidate Entity Name ?

1218

N

Y

1220

Associate The Species Entity Name With The Selected Generic Candidate Entity Name As A Candidate Species Entity Name

FIG. 12B

LIST-BASED ENTITY NAME DETECTION

CROSS REFERENCE TO RELATED APPLICATION

This application claims the benefit of and priority to U.S. patent application Ser. No. 16/550,684 filed Aug. 26, 2019.

BACKGROUND

Named entity recognition is widely used to detect an instance of a named entity in electronic textual documents such as web pages, Portable Document Format (PDF) documents, word processor documents, and so on. Once detected, the knowledge that a named entity is mentioned in a document can be put to a myriad of uses. For example, the document containing an instance of a named entity is sometimes flagged as applicable to that entity, and then stored for future reference. The instance of a named entity in a document is also often tagged with information about the entity or a link pointing to such information. Tagging named entities also allows for indexing, which is used for quicker retrieval of documents based on a search query directed toward the tagged entity.

Entity names could be product names (e.g., a brand name), which includes the names of both tangible and intangible products as well as services. Entity names could also be the name of a person, or a person's title, or a movie, or a book title, or a song title, or the name of a business or government office, or a location. Entity names could also refer to technologies. For example, a document might include a list of electronic entertainment technologies such as computer-generated imagery, immersive virtual reality and ultra-high-definition television. Still further, entity names could refer to a type of product (such as a car), or equipment (such as trenchers, chippers, mini-excavators, skid steers, aerial work platforms, tractor loader backhoes, and other types of equipment used in construction). In general, the entity names can be just about anything.

SUMMARY

List-based entity name detection implementations (entity name detection implementations for short) described herein generally identify entity names in documents. One exemplary implementation takes the form of a system for detecting unknown entity names in documents. This system includes an unknown entity name detector having one or more computing devices, and an unknown entity name detection computer program having a plurality of sub-programs executable by the computing device or devices. The sub-programs configure the computing device or devices to first access document data and identify each list structure in the document data. For each list structure, a sub-program then separates the words in each list structure into candidate entity names. Another sub-program then compares each candidate entity name to a known entity name listing. In general, the known entity name listing includes known entity names, each of which is assigned a single entity type and a single category. Next, for each candidate entity name found to match an entity name in the known entity name listing, a sub-program assigns the entity type and category assigned to that entity name in the known entity name listing to each candidate entity name not matching an entity name in the known entity name listing as a candidate entity type and category for that candidate entity name.

Another exemplary implementation takes the form of a system for detecting ambiguous entity names in documents. This system includes an ambiguous entity name detector having one or more computing devices, and an ambiguous entity name detection computer program having a plurality of sub-programs executable by the computing device or devices. The sub-programs configure the computing device or devices to first access document data and identify each list structure in the document data. For each list structure, a sub-program then separates the words in each list structure into candidate entity names. Another sub-program then compares each candidate entity name to a known entity name listing. This known entity name listing includes known non-ambiguous entity names, each of which is assigned a single entity type and a single category, and further includes known ambiguous entity names, each of which is assigned a single entity type and a single category. An entity name in the known entity name listing is an ambiguous entity name if that entity name can correspond to a known entity name or to an unrelated item. When there is a match found between at least one candidate entity name and an ambiguous entity name in the known entity name listing, for each candidate entity name matching such an ambiguous entity name, it is determined if there is a match between another candidate entity name and a non-ambiguous entity name in the known entity name listing whose assigned entity type and category matches the entity type and category assigned to the ambiguous entity name in the known entity name listing that matched the candidate entity name under consideration. When such an entity type and category match exists, the candidate entity name under consideration is designated as corresponding to the matching ambiguous entity name in the known entity name listing.

Another exemplary implementation takes the form of a system for detecting generic entity names in documents and associating a detected generic entity name with an applicable species entity name. This system includes a generic entity name detector having one or more computing devices, and a generic entity name detection computer program having a plurality of sub-programs executable by the computing device or devices. The sub-programs configure the computing device or devices to first access document data and identify each list structure in the document data. For each list structure, a sub-program then separates the words in each list structure into candidate entity names where each candidate entity name forms a single word or a multiple-word phrase. Another sub-program then compares each candidate entity name to a known entity name listing. This known entity name listing includes known non-generic entity names, each of which is assigned a single entity type and a single category, and further includes known generic entity names, each of which is associated with a separate sub-list of species entity names applicable to the generic entity name. Each of the species entity names is also assigned a single entity type and a single category. Whenever a match is found between at least one candidate entity name and a non-generic entity name in the known entity name listing, as well as a match between at least one candidate entity name and a generic entity name in the known entity name listing, for each candidate entity name found to match a non-generic entity name in the known entity name listing and each candidate entity name found to match a generic entity name in the known entity name listing, the species entity name associated with the matching generic entity name that is assigned the same entity type and category as the non-generic entity name in the known entity name listing that matched a candidate entity name, if any, is identified, and the identified species entity name is associated with the candidate entity name found to match the generic entity name in the known entity name listing as a candidate species entity name.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the entity name detection implementations described herein will become better understood with regard to the following description, appended claims, and accompanying drawings where:

FIG. 1 is a diagram illustrating one implementation, in simplified form, of a system framework for realizing the unknown entity name detection implementations described herein.

FIG. 6 is a diagram illustrating one implementation, in simplified form, of a system framework for realizing the ambiguous entity name detection implementations described herein.

FIG. 9 is a diagram illustrating one implementation, in simplified form, of a system framework for realizing the generic entity name detection implementations described herein.

FIGS. 12A-B are a flow diagram illustrating an exemplary implementation, in simplified form, of a process for detecting generic entity names in documents.

DETAILED DESCRIPTION

Figure 2:
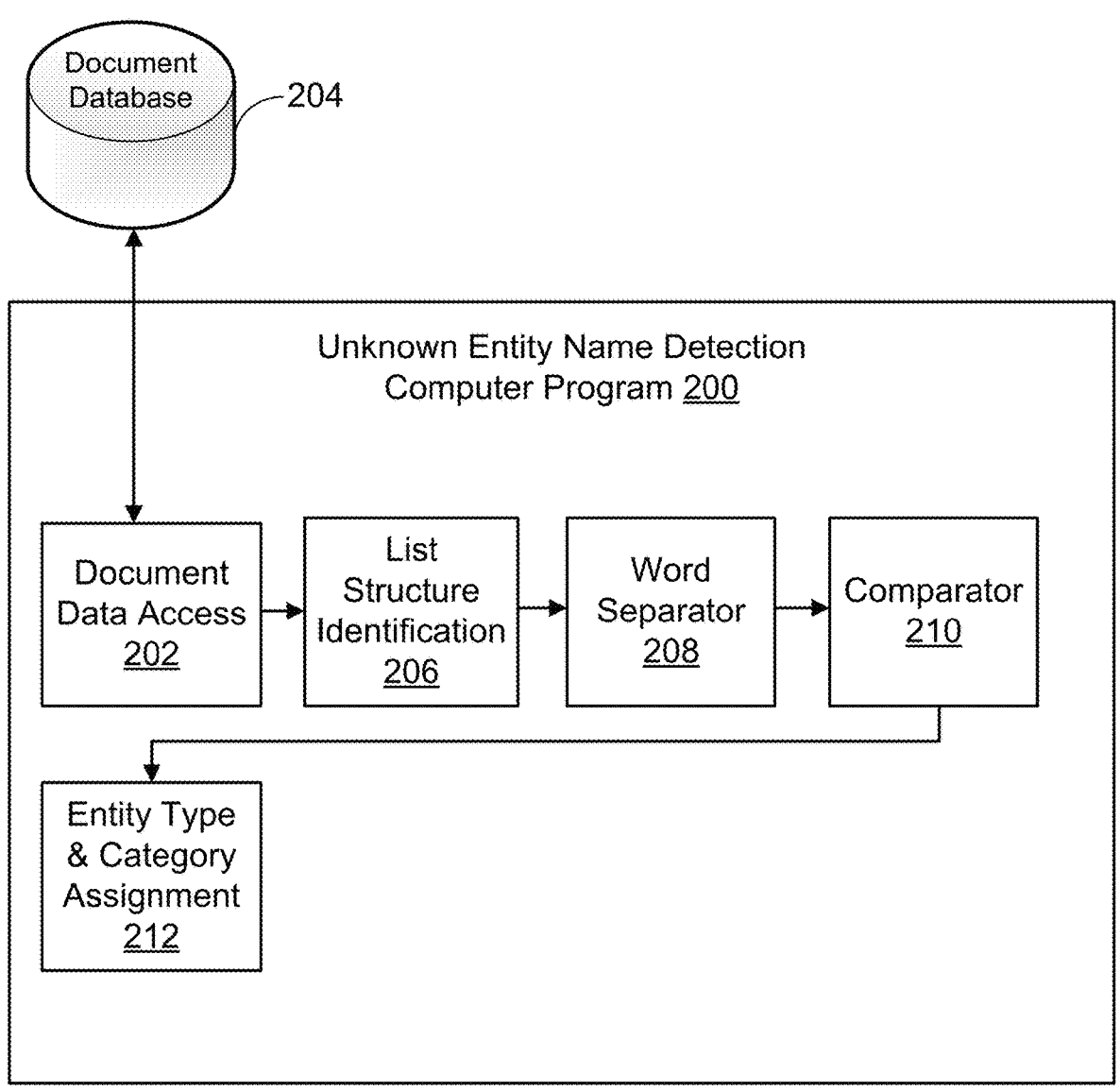
FIG. 2 is a diagram illustrating one implementation, in simplified form, of sub-programs included in the unknown entity name detection computer program.

In the following description of entity name detection implementations reference is made to the accompanying drawings which form a part hereof, and in which are shown, by way of illustration, specific implementations in which the entity name detection can be practiced. It is understood that other implementations can be utilized and structural changes can be made without departing from the scope of the entity name detection implementations.

It is also noted that for the sake of clarity specific terminology will be resorted to in describing the entity name detection implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "some implementations", or "one tested implementation"; or "one version", or "another version", or an "exemplary version", or an "alternate version", or "some versions", or "one tested version"; or "one variant", or "another variant", or an "exemplary variant", or an "alternate variant", or "some variants", or "one tested variant"; means that a particular feature, a particular structure, or particular characteristics described in connection with the implementation/version/variant can be included in one or more implementations of the entity name detection. The appearances of the phrases "in one implementation", "in another implementation", "in an exemplary implementation", "in an alternate implementation", "in some implementations", "in one tested implementation"; "in one version", "in another version", "in an exemplary version", "in an alternate version", "in some versions", "in one tested version"; "in one variant", "in another variant", "in an exemplary variant", "in an alternate variant", "in some variants" and "in one tested variant"; in various places in the specification are not necessarily all referring to the same implementation/version/variant, nor are separate or alternative implementations/versions/variants mutually exclusive of other implementations/versions/variants. Yet furthermore, the order of process flow representing one or more implementations, or versions, or variants of the entity name detection does not inherently indicate any particular order nor imply any limitations of the entity name detection.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," and variants thereof, and other similar words are used in either this detailed description or the claims, these terms are intended to be inclusive, in a manner similar to the term "comprising", as an open transition word without precluding any additional or other elements.

1.0 List-Based Entity Name Detection

List-based entity name detection implementations (or entity name detection implementations for short) that are described herein generally detect entity names in electronic textural documents. Detecting entity names in documents has a variety of advantageous uses. For example, often entity names appearing in documents are unknown (such as a new product name and so on). As such, it is advantageous to detect these unknown entity names. Entity names can also be ambiguous in that the word or words referring to the entity can have other meanings. Thus, it is important to distinguish a mention of such an entity name as referring to the entity or something unrelated. Further still, some entity names appearing in documents are generic in that they can refer to one of a family of different specific species entities. It is advantageous to be able to infer what specific species entity a generic entity name is referring to in a document. These and other advantages will be described in more detail in the sections to follow.

1.1 Detecting Unknown Entity Names

In one implementation, the entity name detection technique identifies entities whose names are previously unidentified. For the purposes of this description, a previously unidentified entity name is one that is not contained in a known entity listing. This known entity listing is a list of known entity names each of which has been assigned at least an entity type (e.g., product) and a category (e.g., computer program).

In general, the entity name detection implementation for detecting unknown entity names in electronic textual documents exploits list structures. More particularly, documents often contain readily identifiable list structures. These list structures typically contain a series of related entity names. For example, a jobs listing document could include a list of computer programs an applicant needs to be proficient in for the position (e.g. Word™, Excel®, Visio®, Powerpoint®, MSProjects™), and so are related in that respect. These listed entities have a common type, namely they are all brand or product names. In addition, they can be characterized as belonging to the same category of product names—specifically computer programs. If it is known that one or more entities in a list structure refer to a known entity name (e.g., a product name found in the known entities listing), it is more likely that any remaining unknown entities in the list structure also refer to the same type of entity (e.g., a product name). In addition, it can be inferred that the unknown entity names belong to the same category as the known entity names (e.g., computer programs).

Figure 1:
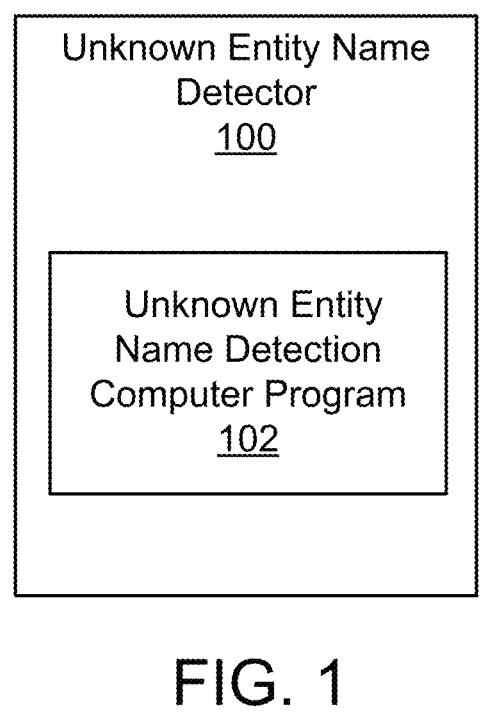

In view of the foregoing, FIG. 1 illustrates one implementation, in simplified form, of a system framework for detecting unknown entity names in electronic textual documents. As exemplified in FIG. 1, the system framework includes an unknown entity name detector including one or more computing devices 100, and an unknown entity name detection computer program 102 having a plurality of sub-programs executable by the computing device or devices of the detector.

FIG. 2 illustrates one implementation, in simplified form, of sub-programs included in the unknown entity name detection computer program 200 that configure the aforementioned computing device or devices. More particularly, a document data access sub-program 202 is included as shown in FIG. 2. The document data access sub-program accesses document data from a database 204.

The unknown entity name detection computer program 200 also includes a list structure identification sub-program 206. The sub-program 206 identifies each list structure in the document data. In one implementation, this involves employing a list finding technique in which a sentence parsing procedure is employed to identify each sentence in the document data and then scanning each sentence for structural indicators of a list. For example, these structural list indicators could include the demarcations used to separate the words in the list (e.g., comma, semicolons, dashes, slashes, spaces, and so on), or if a bulleted list is found, the demarcations could be the bullets preceding each item in the list (e.g., numbers, letter, roman numerals, asterisks, dots, circles, arrows, and so on).

The following sub-programs are then executed for each of the identified list structures. First, a word separator sub-program 208 is employed to separate the words in the list structure into candidate entity names. In one implementation, this involves employing an appropriate word separator technique. In general, an appropriate word separator technique will include a sub-program for cleaning each identified list structure by removing extraneous words and symbols that are not likely to represent a potential entity name. For example, the signal and stop words could be removed, leading/trailing sentence fragments surrounding the list or entities could be removed, a dictionary of common noise words could be employed to identify and remove noise words, and so on. Take, for instance, a sentence with a list in a job posting. This type of sentence often includes phrases leading the list such as "Must have experience with . . . " or "one of . . . ", and trailing words such as "desired". These extraneous words and phrases would be removed before identifying the candidate entity names. The remaining text is then separated using whatever demarcation was used to separate elements of the list structure (e.g., comma, semicolons, dashes, slashes, spaces, and so on), or if a bulleted list is being parsed, the demarcations could be the bullets preceding each entity name in the list (e.g., numbers, letter, roman numerals, asterisks, dots, circles, arrows, and so on). In this way, a series of single word or multiple-word candidate entity names is produced.

Next, a comparator sub-program 210 is employed to compare each candidate entity name to the aforementioned known entity name listing. As described previously, the known entity name listing includes known entity names each of which is assigned a single entity type and a single category. For each candidate entity name found to match an entity name in the known entity name listing, an entity type and category assignment sub-program 212 is then employed. This sub-program assigns the entity type and category assigned to each matching entity name in the known entity name listing to each candidate entity name not matching an entity name in the known entity name listing as a candidate entity type and category. Thus, for example, if just one candidate entity name from the document list structure under consideration matches an entity name in the known entity name listing, then just the entity type and category assigned to that entity name would be assigned to each of the non-matching entity names in the list under consideration as a candidate entity type and category. If, however, more than one candidate entity name from the document list structure under consideration matches different entity names in the known entity name listing, then the entity type and category assigned to each of these entity names would be assigned to each of the non-matching entity names in the list under consideration as a separate candidate entity type and category. On the other hand, if no match is found between one or more candidate entity names and the known entity name listing, the list structure under consideration is disregarded.

In view of the foregoing, a non-matching entity names in the list under consideration can have more than one candidate entity type and category assigned to it. In many cases, the entity names in the known entity name listing found to match candidate entity names will have the same entity type and category owing to the relatedness of the candidate entity names in the list under consideration. In other cases, the entity names in the known entity name listing found to match candidate entity names will have the different entity types and categories. Depending on the intended use for the candidate entity names, further processing may be undertaken to eliminate all but one of the candidate entity type and category pairs newly assigned to a candidate entity name.

With regard to the foregoing matching procedure, in one implementation just exact textural matches are recognized as matches between an entity name in the known entity name listing and an entity name in the list under consideration. In other implementations, the matching procedure can include not only matching text, but also assessing one or more qualifiers. In these later implementations, the known entity name listing includes at least some known entity names that are assigned one or more positive qualifiers, or one or more negative qualifiers, or both. A candidate entity name in a list under consideration can only be matched to an entity name in the known entity name listing if each of the assigned positive qualifiers (if any) are satisfied and if each of the assigned negative qualifiers (if any) are not satisfied. For example, suppose that the known entity name listing includes the entity name "BlueJeans", which refers to a video conferencing application produced by Blue Jeans Network, Inc. of San Jose, California. Also suppose that the "BlueJeans" entity name is associated with a positive qualifier that is satisfied only if the word "application" is found in the document text within 10 words of the "BlueJeans" entity name. Thus, even if a textual match is found between a candidate entity name "BlueJeans", a match with the "BlueJeans" entity name in the known entity name listing, is only declared if the word "application" appears within 10 words of the candidate name in the document containing the list structure under consideration. Similarly, suppose that the entity name "BlueJeans" in the known entity name listing is associated with a negative qualifier that is satisfied if the word "bluejeans" is found in the document text in the phrase "bluejeans Friday". In this case, even if a textual match is found between a candidate entity name "BlueJeans", a match with the "BlueJeans" entity name in the known entity name listing is only declared if the word "BlueJeans" is not found in the document text in the phrase "bluejeans Friday". In a scenario where both the aforementioned positive and negative qualifiers are associated with the "BlueJeans" entity name in the known entity name listing, a match is only declared if the word "BlueJeans" appears within 10 words of the word "application" in the document containing the list structure under consideration; and is not found in the phrase "bluejeans Friday".

1.1.1 Updating the Known Entity Name Listing

In one implementation, a human-assisted validation procedure is employed once one or more candidate entity type and category pairs have been newly assigned to a candidate entity name. This procedure involves a technician reviewing each candidate entity name that has been newly assigned a candidate entity type and category. If a single candidate entity type and category pair has been assigned to a candidate entity name, the technician verifies that the entity name is of that type and category. If, however, the technician finds that the newly assigned candidate entity type and category pair is not applicable to the candidate entity name, that candidate entity name is eliminated from further consideration. If more than one candidate entity type and category pair has been assigned to a candidate entity name, the technician determines which pair is applicable and verifies that pair. The other newly assigned pairs are discarded. Further, if the technician finds that all the newly assigned candidate entity type and category pairs assigned to a candidate entity name are not applicable, the candidate entity name is eliminated from further consideration. Additionally, for each verified candidate entity name, the technician can optionally associate one or more attributes to the entity name that provide more detailed information about the name or the entity it represents.

It is noted that identifying entities whose names were previously unknown using list structures in a document, and then employing the foregoing validation procedure has the advantage of reducing the amount of time a technician must spend to find the unknown entities owing to the fact that list structures typically contain related entity names. This is particularly useful when the document corpus is very large—such as on the order of millions of pages.

Figure 3:
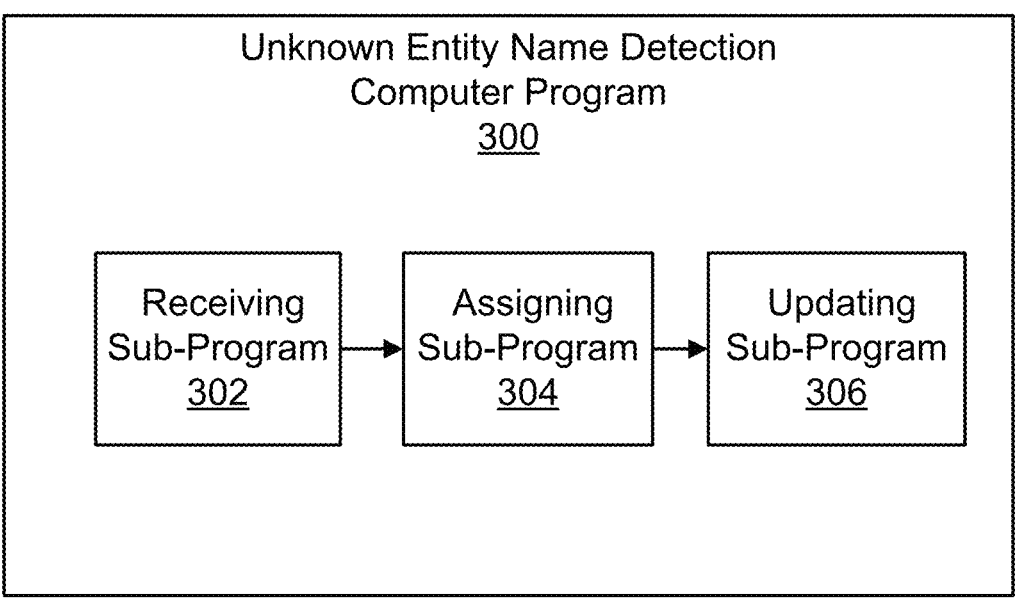
FIG. 3 is a diagram illustrating one implementation, in simplified form, of additional sub-programs included in the unknown entity name detection computer program to add validated entity names to the known entity name listing.

Once a newly discovered entity name has been validated it can be added to the known entity name listing. In one implementation, the unknown entity name detection computer program 300 includes sub-programs to accomplish this task. More particularly, referring to FIG. 3, for each candidate entity name assigned at least one candidate entity type and category, a receiving subprogram 302 receives an instruction that designates the final entity type and category that is to be assigned to the candidate entity name. This final entity type and category corresponds to the entity type and category that was verified for the candidate entity name. An assigning subprogram 304 then assigns the designated entity type and category to the candidate entity name, and an updating sub-program 306 adds the candidate entity name to the known entity name listing.

In one implementation, the unknown entity name detection procedure is repeated for a number of times. For example, suppose that there are lists in the documents being analyzed that contain both known and unknown entity names, as well as lists made up of nothing but unknown entity names. Initially running the unknown entity name detection procedure will discover unknown entity names in the list containing both known and unknown entity names. By repeating the unknown entity name detection procedure once the previously discovered unknown entity name(s) have been added to the aforementioned known entity name listing, the previously unknown entity name(s) may be found in the lists that contained only unknown entity names. In this way, additional previously unknown entity names in the same list will be found. The process of repeating the unknown entity name detection procedure can be continued until no further unknown entity names are discovered.

Another advantage with regard to the identifying unknown entity names in a document is that misspellings and variations in an entity name can be identified as long as it is found in a list structure in a document. For example, the server-side JavaScript runtime environment program "node.js®" is sometimes seen in documents as "nodejs" or "node-js". However, if the node.js® misspellings/variations are found in a list with one or more other matching product names then it would be treated as an unidentified entity name and processed as described previously. It can also be tagged in the document as an entity name having the same type as the matching name(s) and/or added to the known entities list. In this way the known entities list can be expanded to include misspellings and variations in the entity names.

1.1.2 Tagging

Figure 4:
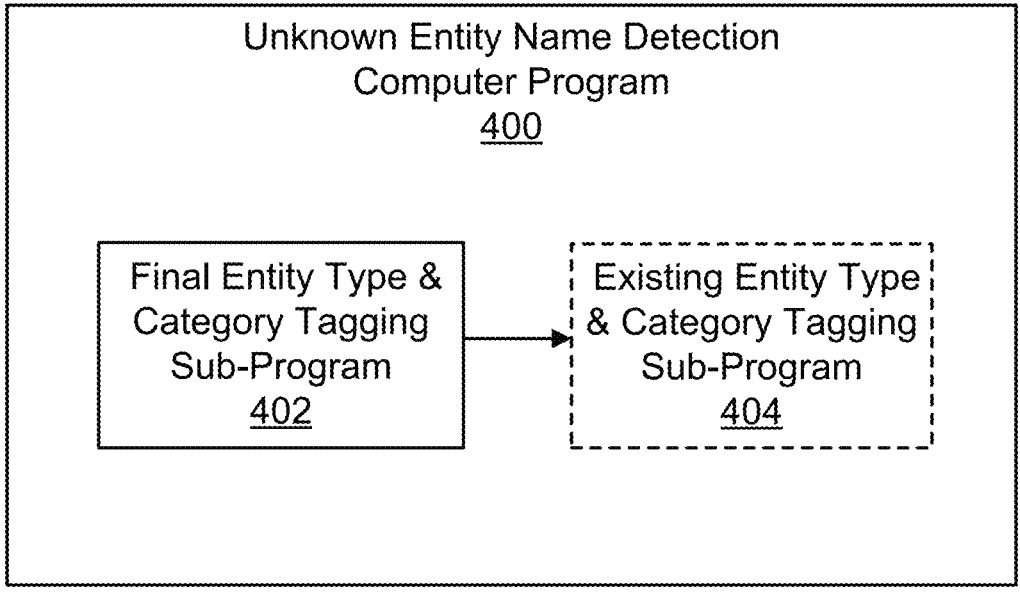
FIG. 4 is a diagram illustrating one implementation, in simplified form, of additional sub-programs included in the unknown entity name detection computer program for tagging the candidate entity names discovered in the document data.

In one implementation, the unknown entity name detection computer program 400 includes sub-programs for tagging the candidate entity names discovered in the document data. More particularly, referring to FIG. 4, in one implementation, once a final entity type and category has been established for a candidate entity name (or after the final entity type and category has been assigned to the candidate entity name, or after the candidate entity name has been added to the known entity name listing), a final entity type and category tagging sub-program 402 tags the candidate entity name in the document data with its newly assigned final entity type and category. Further, each candidate entity name in the document data found to match an entity name in the known entity name listing can be optionally tagged using an existing entity type and category tagging sub-program 404 with the entity type and category assigned to that entity name in the listing. It is noted that the optional nature of the second tagging sub-program is indicated in FIG. 4 by the use of a broken line box.

In addition to the entity type and category information, the candidate entity names in the document data can be tagged with the previously-described attributes that provide more detailed information about the name or the entity it represents. It is further noted that the aforementioned document tags can point to the entity type and category information or the information can be added to the tag itself.

1.1.3 Process for Detecting Unknown Entity Names

Figure 5A:
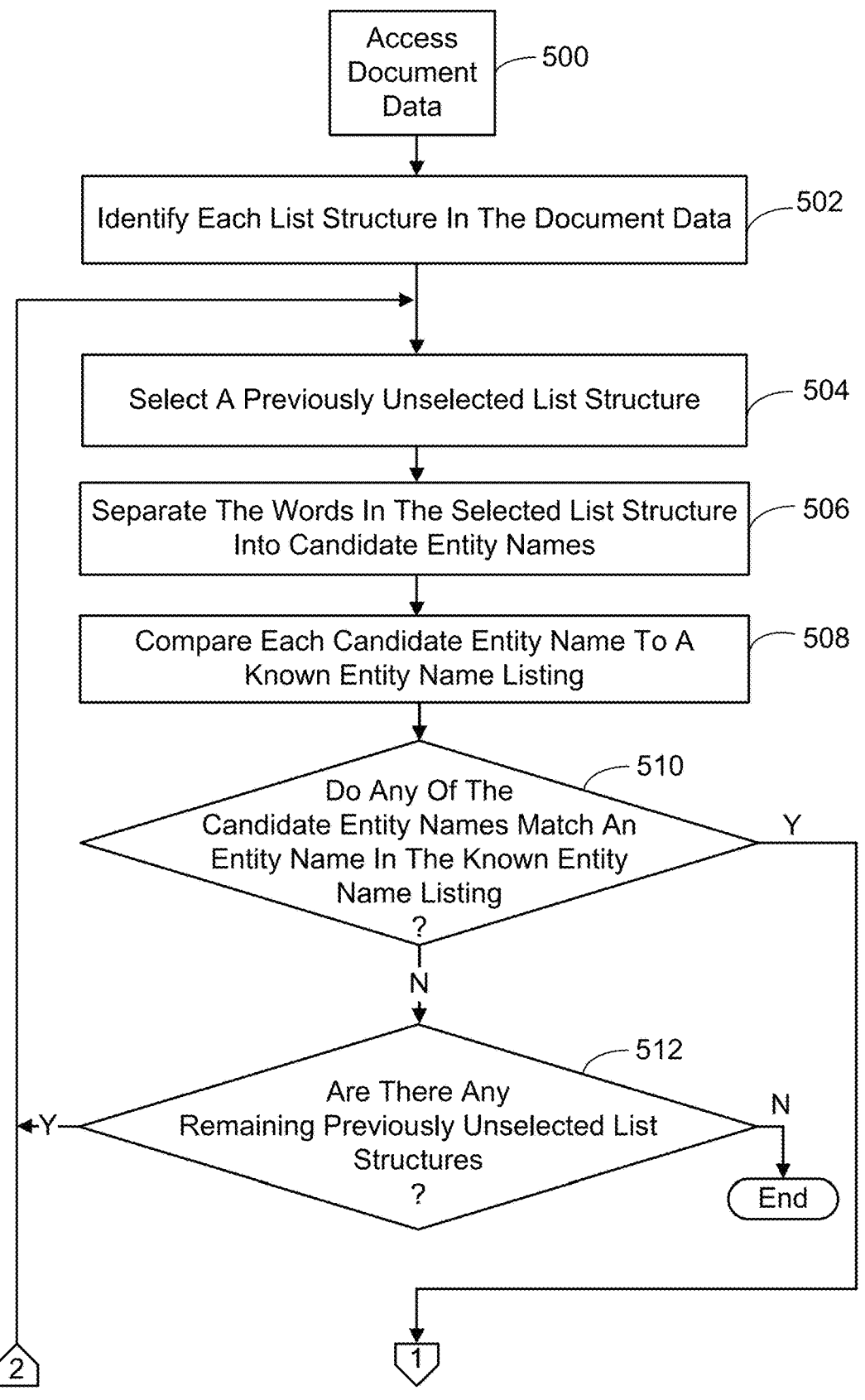
FIGS. 5A-B are a flow diagram illustrating an exemplary implementation, in simplified form, of a process for detecting unknown entity names in documents.
Figure 5B:
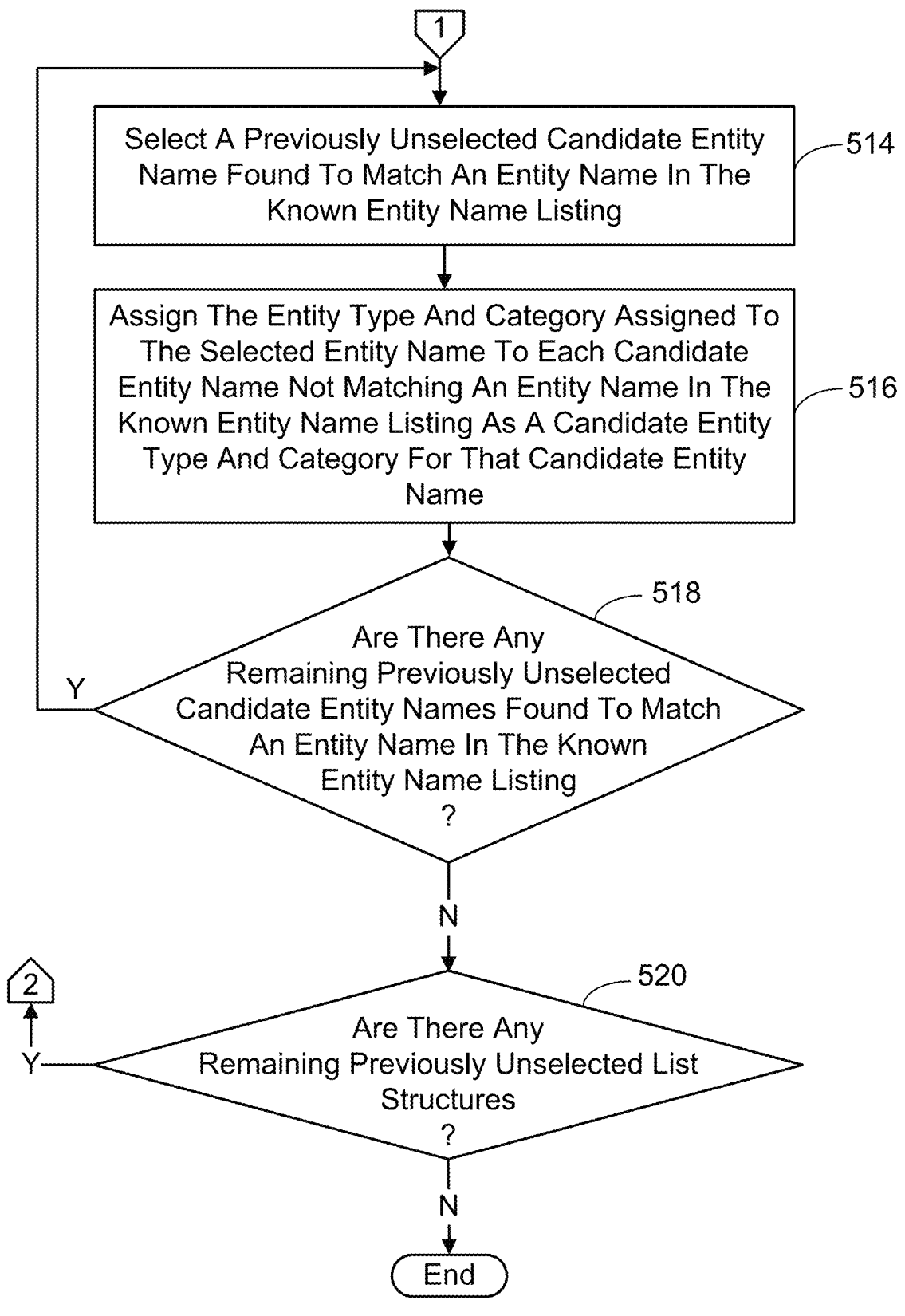

FIGS. 5A-B illustrate an exemplary implementation, in simplified form, of a process for detecting unknown entity names in documents based on the above-described unknown entity name detection computer program as realized on the system framework 100 illustrated in FIG. 1. As exemplified in FIGS. 5A-B, the process starts with accessing document data (process action 500) and then identifying each list structure in the document data (process action 502). Next, a previously unselected list structure is selected (process action 504). The words in the selected list structure are separated into candidate entity names (process action 506), and then each candidate entity name is compared to a known entity name listing (process action 508). As described previously, the known entity name listing includes known entity names each of which is assigned a single entity type and a single category. It is then determined if any of the candidate entity names match an entity name in the known entity name listing (process action 510). If not, it is next determined if there are any remaining previously unselected list structures (process action 512). If there are remining list structures, process actions 504 through 512 are repeated. When no previously unselected list structures remain, the process ends. If, however, one or more candidate entity names match entity names in the known entity name listing, then a previously unselected candidate entity name found to match an entity name in the known entity name listing is selected (process action 514), and the entity type and category assigned to the selected entity name is assigned to each candidate entity name not matching an entity name in the known entity name listing as a candidate entity type and category for that candidate entity name (process action 516). It is then determined if there are any remaining previously unselected candidate entity names found to match an entity name in the known entity name listing (process action 518). If so, process actions 514 through 518 are repeated. When no unselected candidate entity names found to match an entity name in the known entity name listing remain, it is next determined if there are any remaining previously unselected list structures (process action 520). If there are remaining list structures, process actions 504 through 520 are repeated. When no previously unselected list structures remain, the process ends.

1.2 Detecting Ambiguous Entity Names

In one implementation, the entity name detection technique identifies entities whose names are ambiguous. An ambiguous entity name is one that can refer to a particular entity or something unrelated. For example, the computer program product name "Spark™" could appear in a document in different contexts that have nothing to do with a computer program. For instance, the term spark might appear in a document as a verb (e.g., spark your imagination), or as a noun not referring to a computer program (e.g., electrical spark), and so on.

In general, the entity name detection implementation for detecting ambiguous entity names in electronic textual documents also exploits the previously-described list structures. More particularly, if an ambiguous entity name appears in a list of entity names, the ambiguous entity name can be inferred to be the same type of entity as another of the entities in the list. Thus, if an entity having an ambiguous entity name is included in the known entity name listing and it is found to match an entity name found in a list of entity names in a document, then the entity with the ambiguous name in the document list can be deemed to correspond with the matching entity listed in the known entity name listing if another entity name in the document list has the same entity type and category.

The ability to detect ambiguous entity names in electronic textual documents has many advantages. For example, without the ability to automatically identify ambiguous entity names found in a document as being actual entity names, a larger number of names would be identified with some of the names being inaccurate in that they do not relate to the entity that it is desired to identify. If mis-identified entity names are not acceptable then the documents would have to be manually reviewed to eliminate the mis-identified names.

Figure 6:
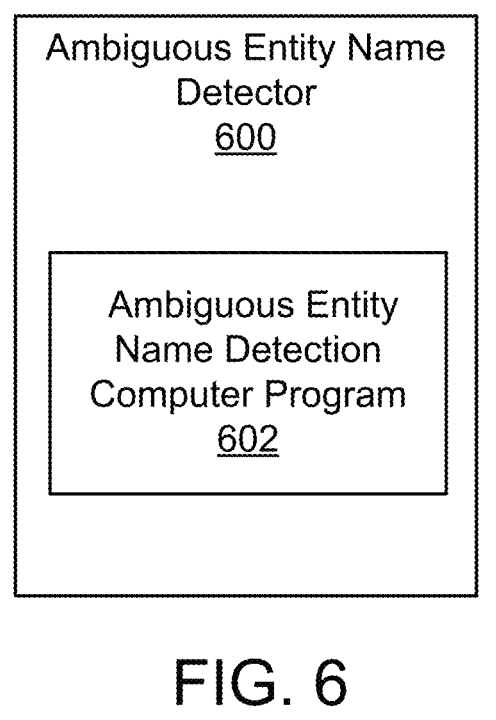

In view of the foregoing, FIG. 6 illustrates one implementation, in simplified form, of a system framework for detecting ambiguous entity names in electronic textual documents. As exemplified in FIG. 6, the system framework includes an ambiguous entity name detector including one or more computing devices 600, and an ambiguous entity name detection computer program 602 having a plurality of sub-programs executable by the computing device or devices of the detector.

Figure 7:
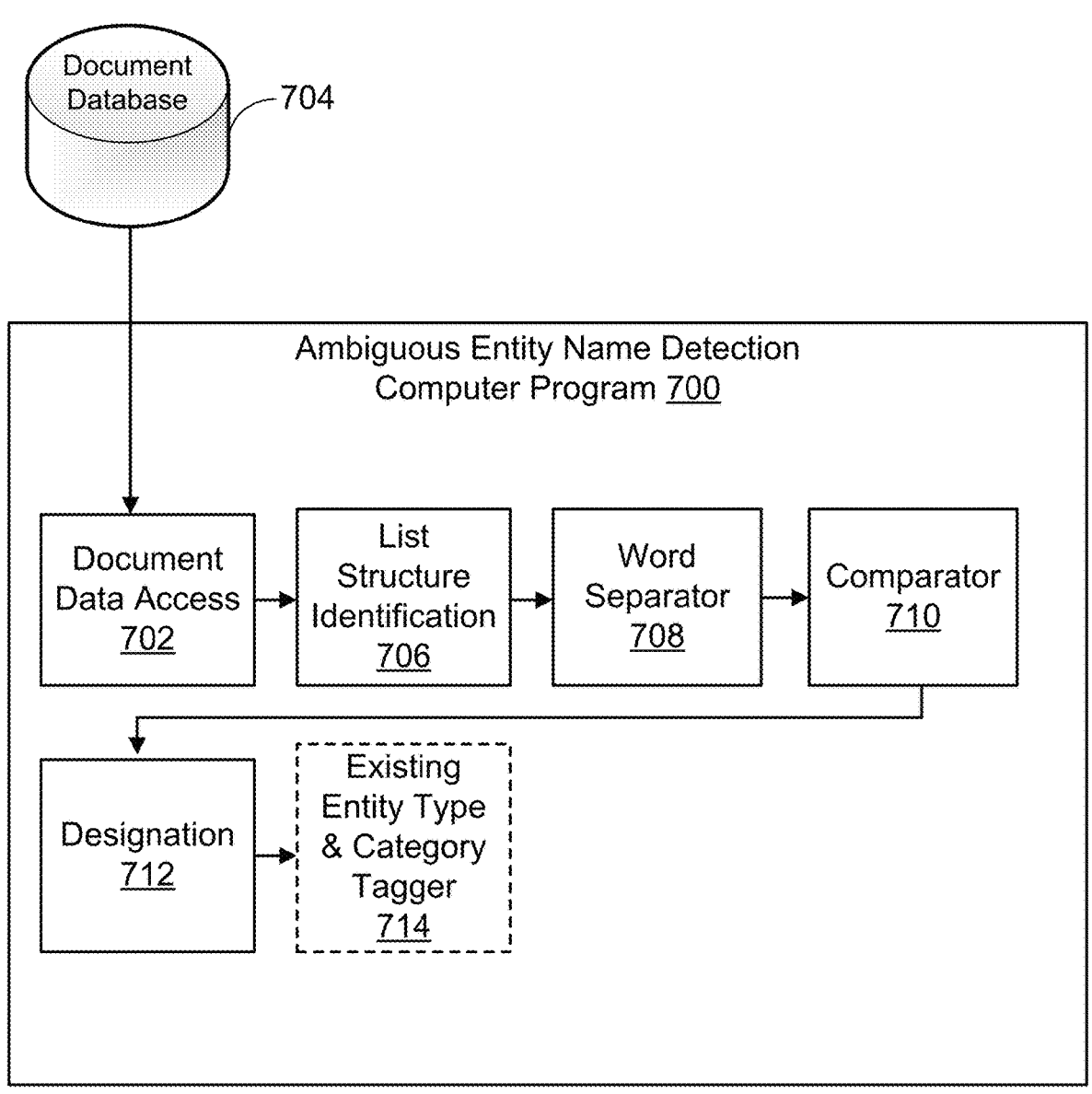
FIG. 7 is a diagram illustrating one implementation, in simplified form, of sub-programs included in the ambiguous entity name detection computer program.

FIG. 7 illustrates one implementation, in simplified form, of sub-programs included in the ambiguous entity name detection computer program 700 that configure the aforementioned computing device or devices. More particularly, a document data access sub-program 702 is included as shown in FIG. 7. The document data access sub-program accesses document data from a database 704.

The ambiguous entity name detection computer program 700 also includes a list structure identification sub-program 706. The sub-program 706 identifies each list structure in the document data. The following sub-programs are then executed for each of the identified list structures. First, a word separator sub-program 708 is employed to separate the words in the list structure into candidate entity names. As with previously-described implementations, in one implementation of the ambiguous entity name detection technique, separating the words in the list structure into candidate entity names involves employing an appropriate word separator technique.

Next, a comparator sub-program 710 is employed to compare each candidate entity name to a known entity name listing. In this implementation, the known entity name listing includes known non-ambiguous entity names, each of which is assigned a single entity type and a single category, and further includes known ambiguous entity names, each of which is assigned a single entity type and a single category. As indicated previously, an entity name in the known entity name listing is an ambiguous entity name if that entity name can correspond to a known entity name or to an unrelated item.

For each candidate entity name found to match an ambiguous entity name in the known entity name listing, it is determined if there is a match between another candidate entity name and a non-ambiguous entity name in the known entity name listing whose assigned entity type and category matches the entity type and category assigned to the ambiguous entity name in the known entity name listing that matched the candidate entity name under consideration. When such an entity type and category match exists, a designation sub-program 712 is employed to designate the candidate entity name under consideration as corresponding to the matching ambiguous entity name in the known entity name listing. On the other hand, if no match is found between a candidate entity name and an ambiguous entity name in the known entity name listing, or even if a match is found between a candidate entity name and an ambiguous entity name in the known entity name listing but no match is found between another candidate entity name and a non-ambiguous entity name in the known entity name listing whose assigned entity type and category matches the entity type and category assigned to the ambiguous entity name in the known entity name listing that matched the candidate entity name under consideration, the list structure under consideration is disregarded.

As with the matching procedure used to detect unknown entity names in documents, in one implementation just exact textural matches are recognized as matches between an entity name in the known entity name listing and an ambiguous entity name in the list structure under consideration. In other implementations, the matching procedure can include not only matching text, but also assessing one or more of the previously-described qualifiers. In these later implementations, the known entity name listing includes at least some known entity names that are assigned one or more positive qualifiers, or one or more negative qualifiers, or both. A candidate entity name in a list under consideration can only be matched to an entity name in the known entity name listing if each of the assigned positive qualifiers (if any) are satisfied and if each of the assigned negative qualifiers (if any) are not satisfied.

1.2.1 Tagging

In one implementation, the ambiguous entity name detection computer program 800 includes sub-programs for tagging the candidate entity names discovered in the document data for both ambiguous and non-ambiguous entity names. More particularly, referring again to FIG. 7, in one implementation, each candidate entity name in the document data found to match an entity name in the known entity name listing, whether ambiguous or not, can be optionally tagged using an existing entity type and category tagging sub-program 714 with the entity type and category assigned to that entity name in the listing. It is noted that the optional nature of the tagging sub-program 714 is indicated in FIG. 7 by the use of a broken line box.

In addition to the entity type and category information, the candidate entity names in the document data can be tagged with the previously-described attributes that provide more detailed information about the name or the entity it represents. It is further noted that the aforementioned document tags can point to the entity type and category information or the information can be added to the tag itself.

1.2.2 Process for Detecting Ambiguous Entity Names

Figure 8A:
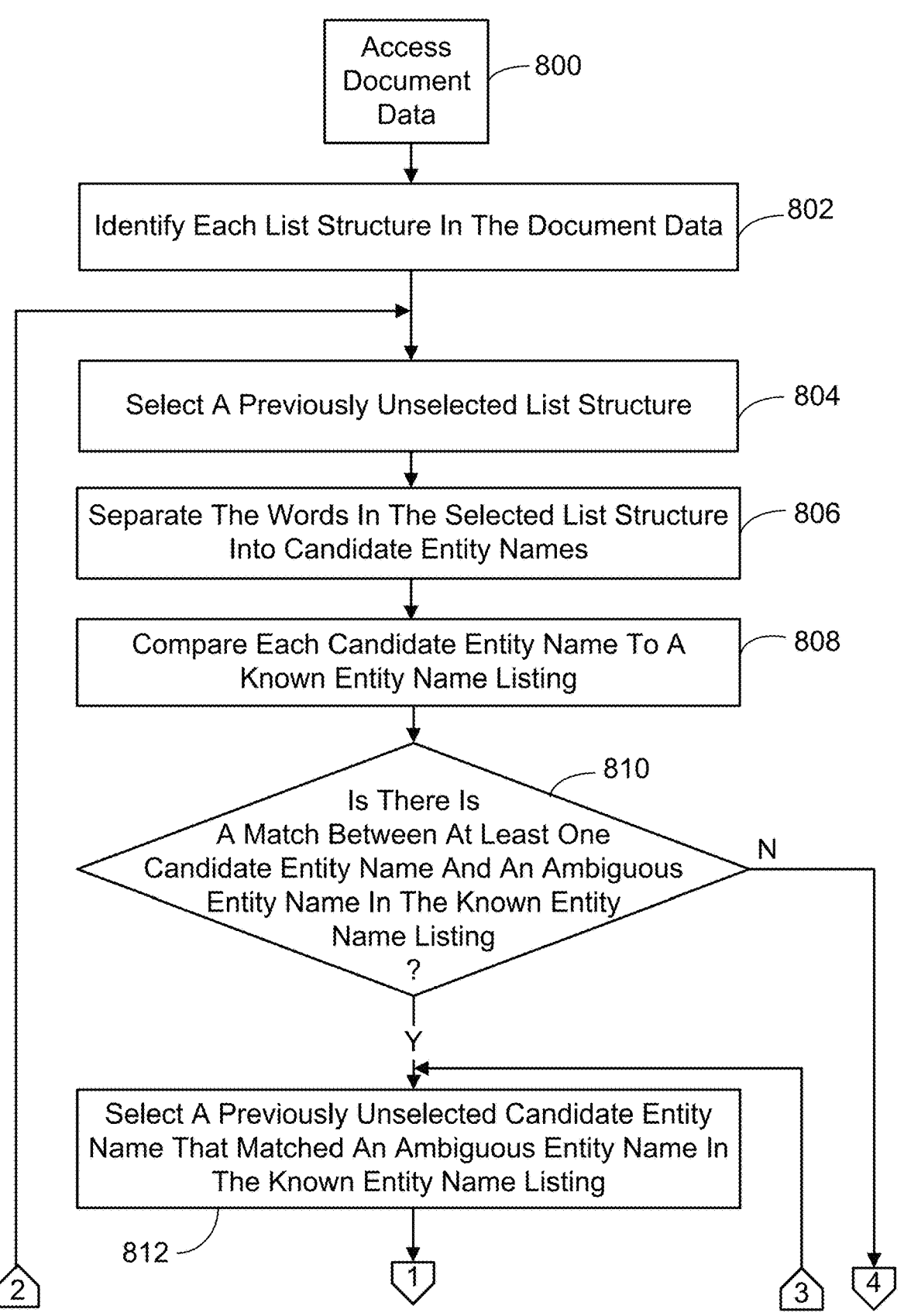
FIGS. 8A-B are a flow diagram illustrating an exemplary implementation, in simplified form, of a process for detecting ambiguous entity names in documents.
Figure 8B:
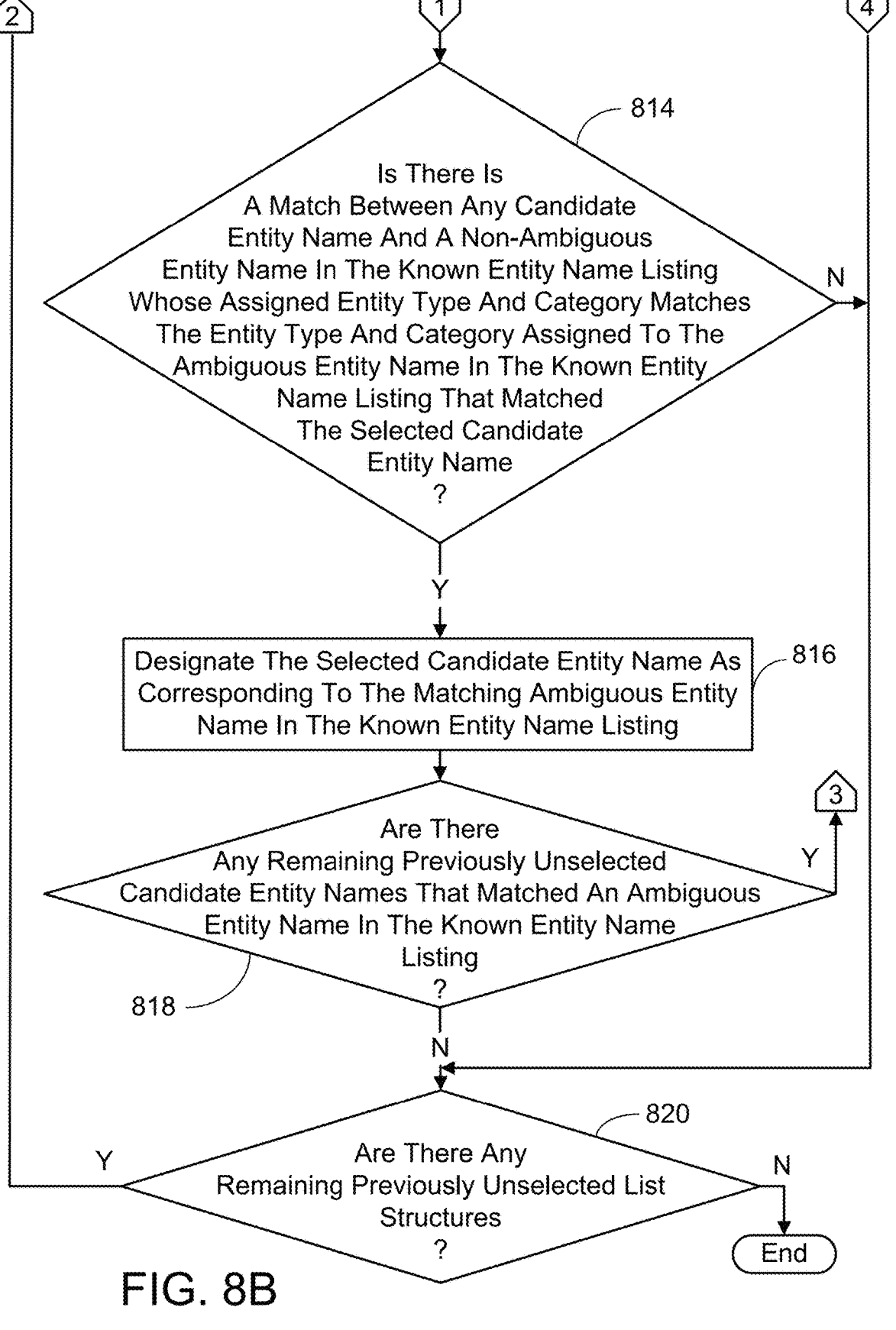

FIGS. 8A-B illustrates an exemplary implementation, in simplified form, of a process for detecting ambiguous entity names in documents based on the above-described ambiguous entity name detection computer program as realized on the system framework 600 illustrated in FIG. 6. As exemplified in FIGS. 8A-B, the process starts with accessing document data (process action 800) and then identifying each list structure in the document data (process action 802). Next, a previously unselected list structure is selected (process action 804). The words in the selected list structure are separated into candidate entity names (process action 806), and then each candidate entity name is compared to a known entity name listing (process action 808). The known entity name listing includes ambiguous and non-ambiguous known entity names each of which is assigned a single entity type and a single category. It is then determined if there is a match between at least one candidate entity name and an ambiguous entity name in the known entity name listing (process action 810). If so, a previously unselected candidate entity name that matched an ambiguous entity name in the known entity name listing is selected (process action 812). Next, it is determined if there is a match between any candidate entity name and a non-ambiguous entity name in the known entity name listing whose assigned entity type and category matches the entity type and category assigned to the ambiguous entity name in the known entity name listing that matched the selected candidate entity name (process action 814). If so, the selected candidate entity name is designated as corresponding to the matching ambiguous entity name in the known entity name listing (process action 816). In this way, ambiguous entity names found in list structures in the document data can be disambiguated. It is then determined if there are any remaining previously unselected candidate entity names that matched an ambiguous entity name in the known entity name listing (process action 818). If so, process actions 812 through 818 are repeated. Once all the candidate entity names that matched an ambiguous entity name in the known entity name listing have been considered, or if in process action 810 no match was found between a candidate entity name and an ambiguous entity name in the known entity name listing, or if in process action 814, no match was found between any candidate entity name and a non-ambiguous entity name in the known entity name listing whose assigned entity type and category matches the entity type and category assigned to the ambiguous entity name in the known entity name listing that matched the selected candidate entity name, it is determined if there are any remaining previously unselected list structures (process action 820). If there are remaining list structures, process actions 804 through 820 are repeated. When no previously unselected list structures remain, the process ends.

1.3 Detecting Generic Entity Names

In one implementation, the entity name detection technique identifies entities whose names are generic and disambiguates a generic entity name by identifying the specific species entity name it refers to in a document. For the purposes of this description, a generic entity name is one that represents a family of different species entity names. Take for instance the entity name "Google®". This name could appear in a document when it is intended to refer to one of many Google® products such as the Google Cloud Platform™, or the Google Cloud Email Provider™, or others.

In general, the entity name detection implementation for detecting generic entity names in electronic textual documents exploits the previously-described list structures. More particularly, the generic entity name detection technique disambiguates a generic entity name appearing in a document if the name appears in a list structure. To this end, known generic entity names are included in the known entity name listing. These generic entity names are different from the other entity names in the listing in that each is associated with a sub-list of the species entity names in its family of names. Each of the species entity names in the sub-list is assigned an entity type and category (and optionally one or more attributes). In operation, the entity name detection implementation for detecting generic entity names detects generic entity names in a list structure and associates a detected generic entity name with an applicable species entity name.

Figure 9:
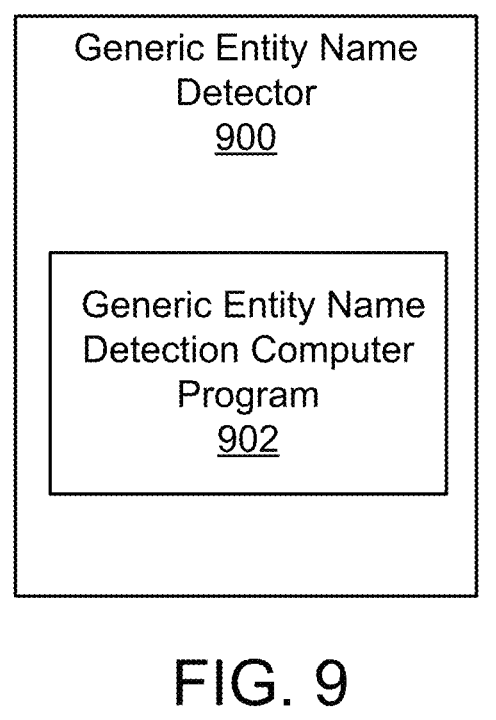

In view of the foregoing, FIG. 9 illustrates one implementation, in simplified form, of a system framework for detecting generic entity names in electronic textual documents. As exemplified in FIG. 9, the system framework includes a generic entity name detector including one or more computing devices 900, and a generic entity name detection computer program 902 having a plurality of subprograms executable by the computing device or devices of the detector.

Figure 10:
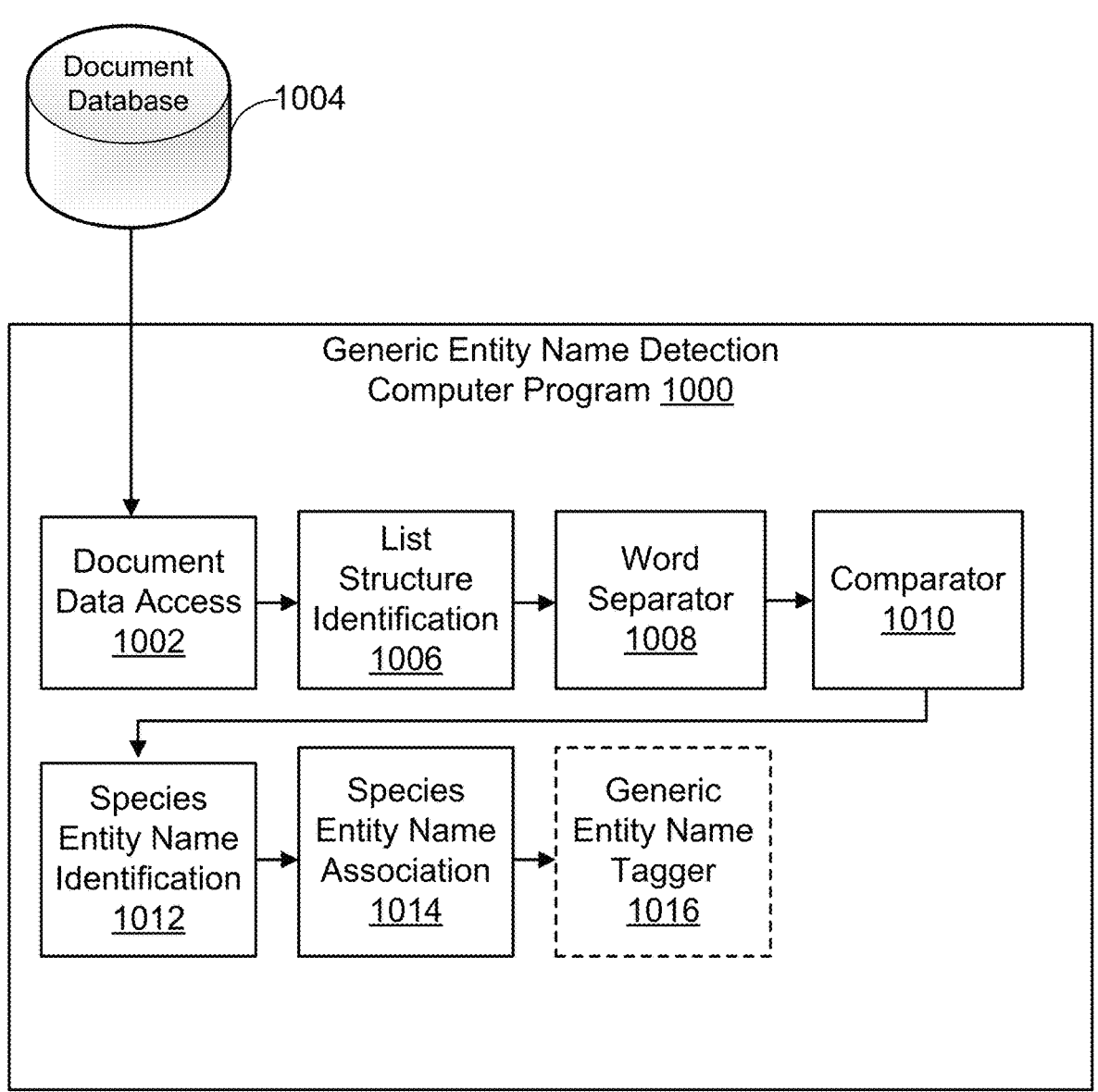
FIG. 10 is a diagram illustrating one implementation, in simplified form, of sub-programs included in the generic entity name detection computer program.

FIG. 10 illustrates one implementation, in simplified form, of sub-programs included in the generic entity name detection computer program 1000 that configure the aforementioned computing device or devices. More particularly, a document data access sub-program 1002 is included as shown in FIG. 10. The document data access sub-program accesses document data from a database 1004.

The generic entity name detection computer program 1000 also includes a list structure identification sub-program 1006. The sub-program 1006 identifies each list structure in the document data. The following sub-programs are then executed for each of the identified list structures. First, a word separator sub-program 1008 is employed to separate the words in the list structure into candidate entity names. As with previously-described implementations, in one implementation of the generic entity name detection technique, separating the words in the list structure into candidate entity names involves employing an appropriate word separator technique.

Next, a comparator sub-program 1010 is employed to compare each candidate entity name to the aforementioned known entity name listing. In this implementation, the known entity name listing includes known non-generic entity names each of which is assigned a single entity type and a single category, and further includes known generic entity names each of which is associated with a separate sub-list of species entity names applicable to the generic entity name. Each of the species entity names is assigned a single entity type and a single category.

If a match is found between at least one candidate entity name and a non-generic entity name in the known entity name listing, as well as a match between at least one candidate entity name and a generic entity name in the known entity name listing, a species entity name identification sub-program 1012 is employed. Otherwise, the list structure under consideration is disregarded. For each candidate entity name found to match a non-generic entity name in the known entity name listing and each candidate entity name found to match a generic entity name in the known entity name listing, the sub-program 1012 identifies the species entity name associated with the matching generic entity name that is assigned the same entity type and category as the non-generic entity name in the known entity name listing that matched a candidate entity name, if there is one. For each candidate entity name found to match a generic entity name in the known entity name listing, a species entity name association sub-program 1014 is then employed to associate the identified species entity name to the candidate entity name found to match the generic entity name in the known entity name listing as a candidate species entity name.

In view of the foregoing it is evident that if there are more than one candidate entity names in a list structure under consideration that match a non-generic entity name in the known entity name listing, each of the candidate entity names in the list structure found to match a generic entity name in the known entity name listing can be associated with more than one species entity name. In many cases, some or all the species entity names associated with a generic entity name in a list structure under consideration will be the same owing to the relatedness of the candidate entity names in the list structure (i.e., the non-generic known entity names in the known entity name listing that match non-generic candidate entity names in the list structure under consideration will have the same entity types and categories). In other cases, some or all the species entity names associated with a generic entity name in a list structure under consideration will be different (i.e., the non-generic known entity names in the known entity name listing that match non-generic candidate entity names in the list structure under consideration will have the different entity types and categories).

Depending on the intended use for the generic candidate entity names, further processing may be undertaken to eliminate all but one of the species associated with the generic candidate entity names. In one implementation, a human-assisted validation procedure is employed to verify that a species entity name associated with a generic name in a list structure is of the correct entity type and category for that generic entity name. If a technician finds that the species entity name newly associated with a generic candidate entity name is not applicable, the generic candidate entity name is eliminated from further consideration. In cases where more than one species entity name has been associated with a generic entity name in a list structure, the verification procedure includes eliminating all but one of the species entity names. However, if the technician finds that all the species entity names newly associated with a generic candidate entity name are not applicable, the generic candidate entity name is eliminated from further consideration.

Figure 11:
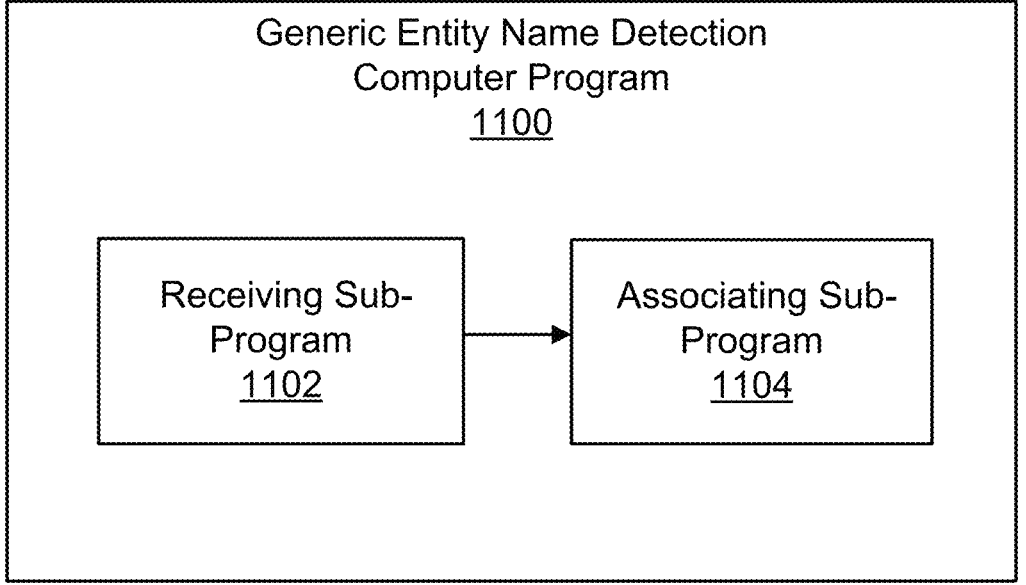
FIG. 11 is a diagram illustrating one implementation, in simplified form, of additional sub-programs included in the generic entity name detection computer program that receive instructions and associate species entity names, as well as their entity types and categories, with the generic candidate entity names.

Once a species entity name associated with a generic entity name found in a list structure is verified, in one implementation, the generic entity name detection computer program 1100 is employed to implement the results of the verification. More particularly, referring to FIG. 11, for each generic candidate entity name associated with at least one candidate species entity name, a receiving subprogram 1102 receives an instruction that designates the species entity name as well as its entity type and category that is to be associated with the generic candidate entity name. The species entity name corresponds to the name that was verified for the generic candidate entity name. An associating subprogram 1104 then associates the designated species entity name as well as its entity type and category to the candidate entity name.

It is noted that associating a species entity name with a generic entity name found in a list structure, and then employing the foregoing validation procedure has the advantage of reducing the amount of time a technician must spend to find an appropriate species entity name owing to the fact that list structures often contain related entity names.

As with previously-described implementations, the matching procedure used to detect generic entity names in documents, involves in one implementation, just exact textural matches being recognized as matches between an generic entity name in the known entity name listing and a generic entity name in the list structure under consideration. In other implementations, the matching procedure can include not only matching text, but also assessing one or more of the previously-described qualifiers. In these later implementations, the known entity name listing includes at least some generic known entity names that are assigned one or more positive qualifiers, or one or more negative qualifiers, or both. A generic candidate entity name in a list under consideration can only be matched to a generic entity name in the known entity name listing if each of the assigned positive qualifiers (if any) are satisfied and if each of the assigned negative qualifiers (if any) are not satisfied.

1.3.1 Tagging

In one implementation, the generic entity name detection computer program 1000 includes a sub-program for tagging the generic candidate entity names discovered in the document data. More particularly, referring again to FIG. 10, in one implementation, an optional generic entity name tagging sub-program 1016 is employed to tag each generic candidate candidate entity name in the document data with the associated species entity name along with the entity type and category assigned to the associated species entity name. It is noted that the optional nature of the tagging sub-program 1016 is indicated in FIG. 10 by the use of a broken line box. It is further noted that the aforementioned document tags can point to the species entity name and its entity type and category information, or the information can be added to the tag itself.

1.3.2 Process for Detecting Generic Entity Names

Figure 12A:
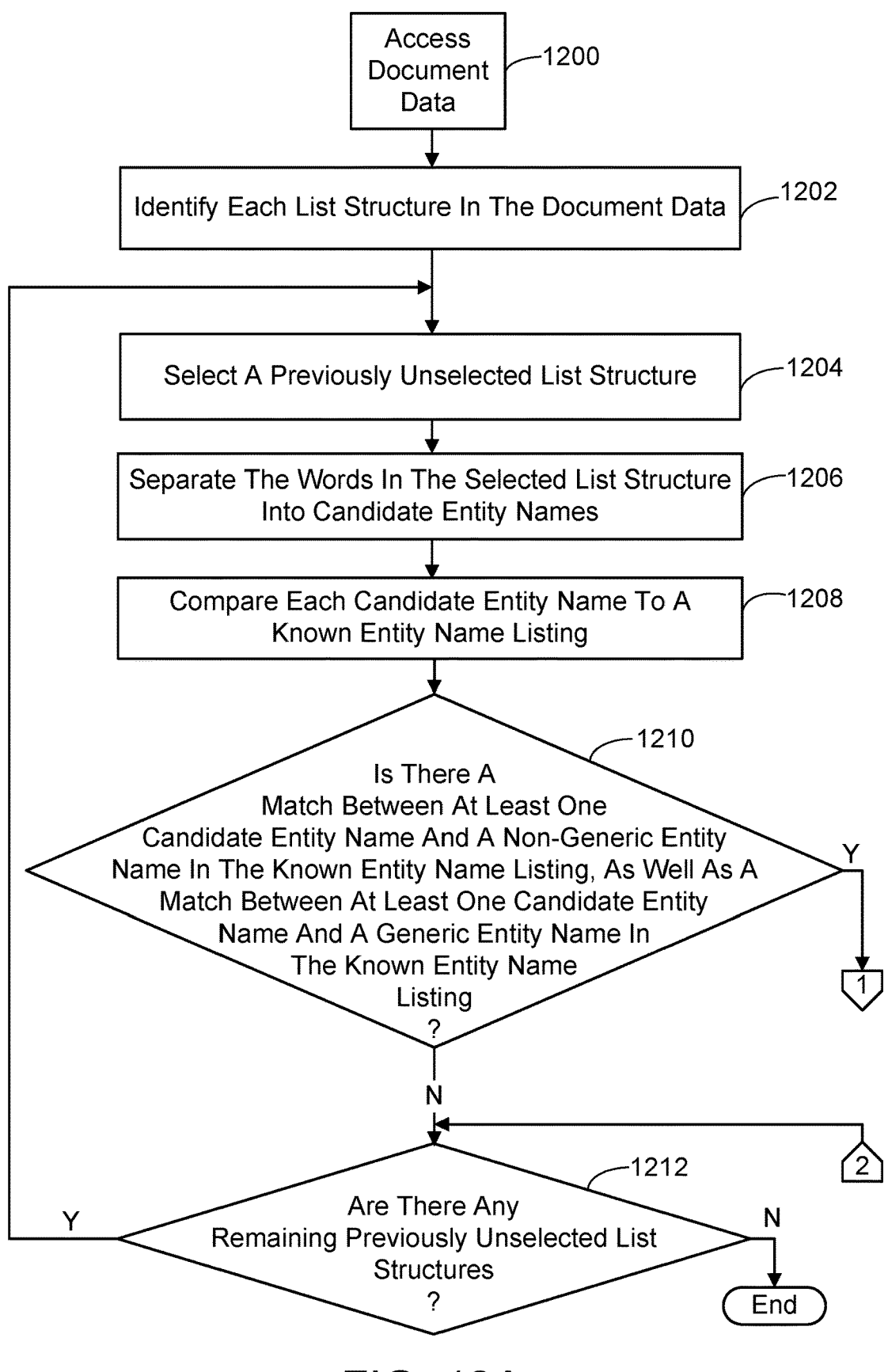

FIGS. 12A-B illustrate an exemplary implementation, in simplified form, of a process for detecting generic entity names in documents based on the above-described generic entity name detection computer program as realized on the system framework 900 illustrated in FIG. 9. As exemplified in FIGS. 12A-B, the process starts with accessing document data (process action 1200) and then identifying each list structure in the document data (process action 1202). Next, a previously unselected list structure is selected (process action 1204). The words in the selected list structure are separated into candidate entity names (process action 1206), and then each candidate entity name is compared to a known entity name listing (process action 1208). The known entity name listing includes known non-generic entity names each of which is assigned a single entity type and a single category, and further includes known generic entity names each of which is associated with a separate sub-list of species entity names applicable to the generic entity name. Each of the species entity names is also assigned a single entity type and a single category. It is then determined there is a match between at least one candidate entity name and a non-generic entity name in the known entity name listing, as well as a match between at least one candidate entity name and a generic entity name in the known entity name listing (process action 1210). If not, it is next determined if there are any remaining previously unselected list structures (process action 1212). If there are remaining list structures, process actions 1204 through 1212 are repeated. When no previously unselected list structures remain, the process ends. If, however, there is a match between at least one candidate entity name and a non-generic entity name in the known entity name listing, as well as a match between at least one candidate entity name and a generic entity name in the known entity name listing, a previously unselected generic candidate entity name found to match a generic entity name in the known entity name listing is selected (process action 1214). In addition, a previously unselected (since the last generic candidate entity name was selected) non-generic candidate entity name found to match a non-generic entity name in the known entity name listing is selected (process action 1216). It is then determined if there is a species entity name associated with the generic entity name that matched the selected generic candidate entity name that is assigned the same entity type and category as the non-generic entity name in the known entity name listing that matched the selected non-generic candidate entity name (process action 1218). If yes, that species entity name is associated with the selected generic candidate entity name as a candidate species entity name (process action 1220). Once the species entity name is associated with the selected generic candidate entity name as a candidate species entity name, or if no species entity name associated with the generic entity name that matched the selected generic candidate entity name was found that is assigned the same entity type and category as the non-generic entity name in the known entity name listing that matched the selected non-generic candidate entity name, it is determined if there are any remaining unselected non-generic candidate entity names that were found to match a non-generic entity name in the known entity name listing (process action 1222). If so, process actions 1214 through 1222 are repeated as appropriate. If, however, there are no remaining unselected non-generic candidate entity names that were found to match a non-generic entity name in the known entity name listing, then it is determined if there are any remaining previously unselected generic candidate entity names found to match a generic entity name in the known entity name listing (process action 1224). If so, process action 1214 through 1224 are repeated as appropriate. If not, it is next determined if there are any remaining previously unselected list structures (process action 1212). If there are remaining list structures, process actions 1204 through 1224 are repeated, as appropriate. When no previously unselected list structures remain, the process ends.

2.0 Other Advantages and Implementations

Another advantage of detecting entity names in documents, regardless of whether they are known, unknown, ambiguous, or generic involves looking at a large corpus of documents. More particularly, the number of times an entity name is detected (assuming unknown entity names are first identified and added to the known entity name listing as described previously, ambiguous entity names have been disambiguated as described previously, and generic entity names have been associated with a species entity name) can be recorded. Analyzing the totals will indicate which entity names are mentioned more often. This can be an indicator of popularity. For example, more mentions of a product name or a movie title can indicate that the product or movie is more popular than other products and movies. This type of information can be quite valuable to advertisers, product manufacturers, technology vendors, researchers and the like in their efforts to monitor the marketplace. Further, the entity name detection implementations described herein can be periodically repeated (for example monthly or quarterly) using a new corpus of documents published since the end of the last detection period or an updated corpus to which newly published documents have been added. This would produce a current count of the times each discovered entity name appears in the documents under consideration. Comparing the current count to previous counts can be used to identify trends, such as which products are being mentioned more or less than in the past or the emergence of new products. This trend information is also quite valuable to advertisers, product manufacturers, technology vendors, researchers and the like.

While the entity name detection has been described by specific reference to implementations thereof, it is understood that variations and modifications thereof can be made without departing from the true spirit and scope.

It is further noted that any or all of the implementations that are described in the present document and any or all of the implementations that are illustrated in the accompanying drawings may be used and thus claimed in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 13:
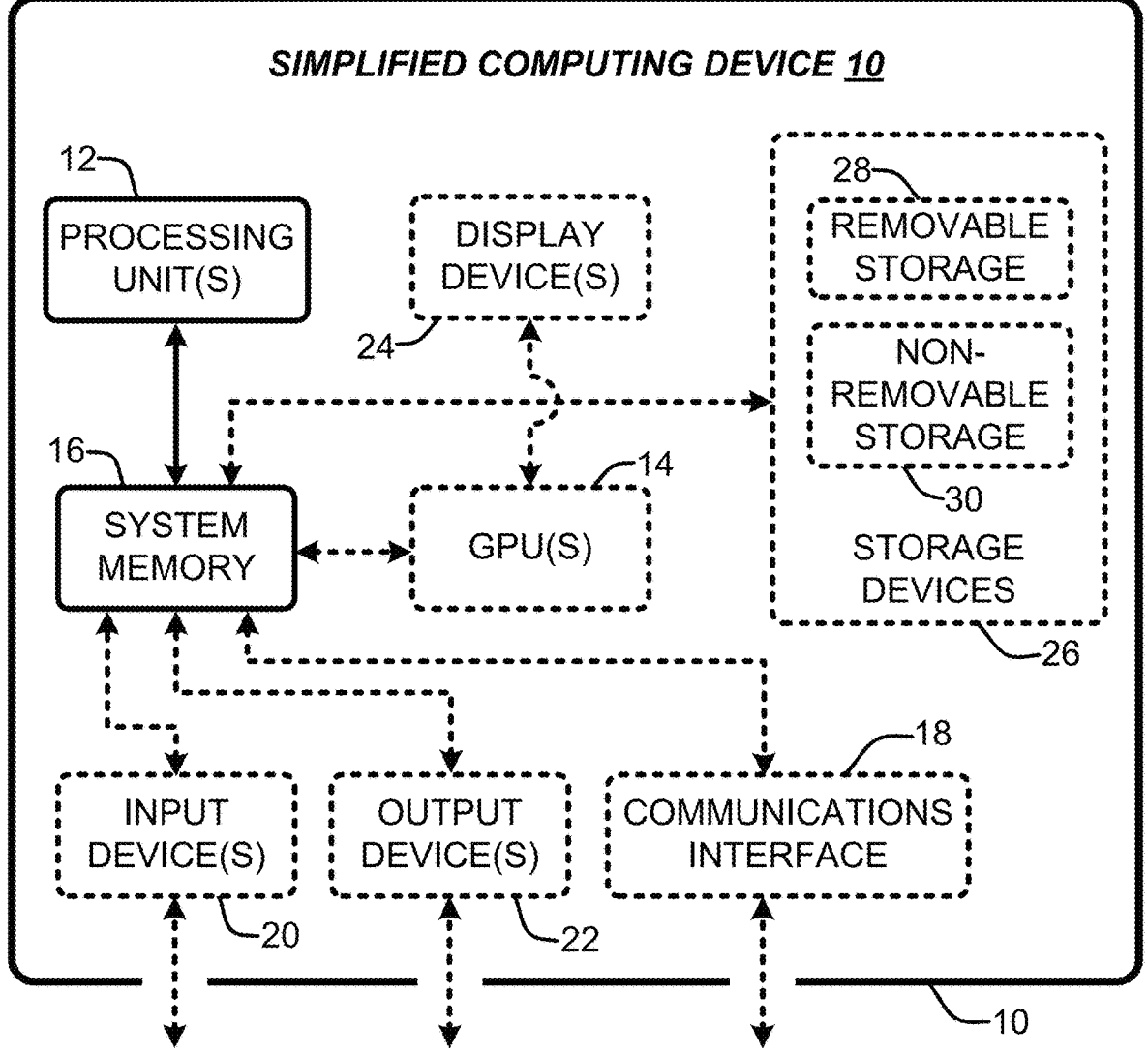
FIG. 13 is a diagram illustrating a simplified example of a general-purpose computer system on which various implementations and elements of the entity name detection technique, as described herein, may be realized.

The entity name detection implementations described herein are operational within numerous types of general purpose or special purpose computing system environments or configurations. FIG. 13 illustrates a simplified example of a general-purpose computer system on which various implementations and elements of the entity name detection, as described herein, may be implemented. It is noted that any boxes that are represented by broken or dashed lines in the simplified computing device 10 shown in FIG. 13 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the entity name detection implementations described herein, the device should have a sufficient computational capability and system memory to enable basic computational operations. In particular, the computational capability of the simplified computing device 10 shown in FIG. 13 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the entity name detection implementations described herein, including input, output, control, feedback, and response to one or more users or other devices or systems associated with the entity name detection implementations, are enabled by a variety of Natural User Interface (NUI) scenarios. The NUI techniques and scenarios enabled by the entity name detection implementations include, but are not limited to, interface technologies that allow one or more users user to interact with the entity name detection implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the entity name detection implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the entity name detection implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 13 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various entity name detection implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The entity name detection implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The entity name detection implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, the entity name detection implementations described herein can be virtualized and realized as a virtual machine running on a computing device such as any of those described previously. In addition, multiple entity name detection virtual machines can operate independently on the same computer device.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A system for disambiguating ambiguous entity names in documents, comprising:

an ambiguous entity name detector comprising one or more computing devices, and an ambiguous entity name detection computer program having a plurality of sub-programs executable by said computing device or devices, wherein the sub-programs configure said computing device or devices to, access document data, said document data comprising at least one list structure that has entity names as elements and wherein one or more of the elements in the at least one list structure is an ambiguous entity name, identify each list structure in the document data, for each list structure, separate the words in the list structure under consideration into candidate entity names, compare each candidate entity name to a known entity name listing, wherein the known entity name listing comprises known non-ambiguous entity names each of which is assigned a single entity type and a single category, and further comprises known ambiguous entity names each of which is assigned a single entity type and a single category, and wherein an entity name in the known entity name listing is an ambiguous entity name if that entity name corresponds to a known entity name and is additionally known to correspond to a name comprising a noun or verb or both unrelated to the known entity name, determine if there is a match between at least one candidate entity name and an ambiguous entity name in the known entity name listing, and whenever there is a match found between at least one candidate entity name and an ambiguous entity name in the known entity name listing, for each candidate entity name in the list structure under consideration matching such an ambiguous entity name, determine if there is a match between another candidate entity name in the list structure under consideration and a non-ambiguous entity name in the known entity name listing whose assigned entity type and category matches the entity type and category assigned to the ambiguous entity name in the known entity name listing that matched the candidate entity name under consideration, and whenever such an entity type and category match is found, tag the candidate entity name under consideration with information indicative of the matching entity type and category to produce a disambiguated list structure in the accessed document data.

2. The system of claim 1, wherein the known entity name listing comprises known entity names that are assigned one or more positive qualifiers, or one or more negative qualifiers, or both, and which can only be matched to a candidate entity name if each of the assigned positive qualifiers, if any, are satisfied and if each of the assigned negative qualifiers, if any, are not satisfied.

3. The system of claim 1, wherein the sub-program for separating the words in each list structure into candidate entity names is preceded by a sub-program for cleaning each identified list structure by removing extraneous words and symbols that are not likely to represent a potential entity name.

4. The system of claim 1, wherein each candidate entity name comprises a single word or a multiple-word phrase.

5. The system of claim 1, further comprising a sub-program for tagging each candidate entity name in the document data found to match an entity name in the known entity name listing with the entity type and category assigned to that entity name.

6. The system of claim 1, further comprising a sub-program for, whenever no match is found between a candidate entity name and an ambiguous entity name in the known entity name listing, or even if a match is found between a candidate entity name and an ambiguous entity name in the known entity name listing but no match is found between another candidate entity name and a non-ambiguous entity name in the known entity name listing whose assigned entity type and category matches the entity type and category assigned to the ambiguous entity name in the known entity name listing that matched the candidate entity name under consideration, the list structure under consideration is disregarded.

7. A system for disambiguating generic entity names in documents by associating and tagging a detected generic entity name with an applicable species entity name, comprising:

a generic entity name detector comprising one or more computing devices, and a generic entity name detection computer program having a plurality of sub-programs executable by said computing device or devices, wherein the sub-programs configure said computing device or devices to, access document data, said document data comprising at least one list structure that has entity names as elements and wherein one or more of the elements in the at least one list structure is a generic entity name, identify each list structure in the document data, for each list structure, separate the words in the list structure under consideration into candidate entity names, wherein each candidate entity name comprises a single word or a multiple-word phrase, compare each candidate entity name to a known entity name listing, wherein the known entity name listing comprises known non-generic entity names each of which is assigned a single entity type and a single category, and further comprises known generic entity names each of which is associated with a separate sub-list of species entity names applicable to the generic entity name wherein each of the species entity names is assigned a single entity type and a single category, determine if there is a match between at least one candidate entity name and a non-generic entity name in the known entity name listing, determine if there is a match between at least one candidate entity name in the list structure under consideration and a generic entity name in the known entity name listing, and whenever a match is found between at least one candidate entity name in the list structure under consideration and a non-generic entity name in the known entity name listing, as well as a match between at least one candidate entity name in the list structure under consideration and a generic entity name in the known entity name listing, for each candidate entity name in the list structure under consideration found to match a non-generic entity name in the known entity name listing and each candidate entity name in the list structure under consideration found to match a generic entity name in the known entity name listing, determine if a species entity name associated with the matching generic entity name is assigned the same entity type and category as the non-generic entity name in the known entity name listing that matched a candidate entity name, and if a match is found, associate the identified species entity name to the candidate entity name found to match the generic entity name in the known entity name listing as a candidate species entity name, and tag the candidate entity name found to match the generic entity name in the known entity name listing with information indicative of the identified species entity name and its assigned entity type and category to produce a disambiguated list structure in the accessed document data.

8. The system of claim 7, wherein the known non-generic entity names, or known generic entity names, or both, of the known entity name listing are each assigned one or more positive qualifiers, or one or more negative qualifiers, or both, and which can only be matched to a candidate entity name if each of the assigned positive qualifiers, if any, are satisfied and if each of the assigned negative qualifiers, if any, are not satisfied.

9. The system of claim 7, wherein the sub-program for separating the words in each list structure into candidate entity names is preceded by a sub-program for cleaning each identified list structure by removing extraneous words and symbols that are not likely to represent a potential entity name.

10. The system of claim 7, further comprising sub-programs for:

for each candidate entity name associated with more than one candidate species entity name, receiving an instruction that designates the species entity name as well as the entity type and category that is to be assigned to the candidate entity name, assigning the designated species entity name as well as the designated entity type and category to the candidate entity name and eliminating each other candidate entity species name and its assigned entity type and category previously associated with and tagged to the candidate entity name, and tagging the candidate entity name in the document data with the assigned species entity name along with the assigned entity type and category.

11. The system of claim 7, further comprising a sub-program for tagging each candidate entity name in the document found to match a non-generic entity name in the known entity name listing with the entity type and category assigned to that entity name.

12. The system of claim 7, further comprising a sub-program for, whenever no match is found between one or more candidate entity names in the list structure and non-generic entity names in the known entity name listing, disregard the list structure under consideration.

* * * * *